United States Patent [19]

Kuhn et al.

[11] Patent Number: 5,030,508

[45] Date of Patent: Jul. 9, 1991

[54] METHOD FOR MAKING ELECTRICALLY CONDUCTIVE TEXTILE MATERIALS

[75] Inventors: Hans H. Kuhn; William C. Kimbrell, Jr., both of Spartanburg, S.C.

[73] Assignee: Milliken Research Corporation, Spartanburg, S.C.

[21] Appl. No.: 604,694

[22] Filed: Oct. 26, 1990

Related U.S. Application Data

[62] Division of Ser. No. 211,628, Jun. 27, 1988, Pat. No. 4,981,718.

[51] Int. Cl.[5] ........................ B05D 5/12; B32B 27/08; B32B 27/26; B32B 33/00

[52] U.S. Cl. .................................... 428/253; 252/500; 252/518; 427/121; 428/272; 428/273; 428/288; 428/290; 428/296; 428/336; 428/392; 428/395; 428/902

[58] Field of Search .................. 427/58, 121; 428/253, 428/272, 273, 288, 290, 296, 336, 392, 395, 902; 252/500, 518

[56] References Cited

U.S. PATENT DOCUMENTS

| | | | |
|---|---|---|---|
| 4,803,096 | 2/1989 | Kuhn | 252/500 |
| 4,975,317 | 12/1990 | Kuhn | 428/253 |
| 4,981,718 | 1/1991 | Kuhn | 427/121 |

*Primary Examiner*—James C. Cannon

*Attorney, Agent, or Firm*—Timothy J. Monahan; H. William Petry

[57] ABSTRACT

Fabrics are made electrically conductive by contacting the fiber under agitation conditions with an aqueous solution of an aniline compound, oxidizing agent and a doping agent or counter ion and then depositing onto the surface of individual fibers of the fabric a prepolymer of the aniline compound so as to uniformly and coherently cover the fibers with a conductive film of the polymerized aniline compound and wherein, furthermore, the oxidizing agent is a vanadyl compound whereby the reaction rate is controlled such that the prepolymer is uniformly and coherently adsorbed onto the surface of the textile material, thereby providing improved films of electrically conductive polymerized compound on the textile material.

7 Claims, No Drawings

METHOD FOR MAKING ELECTRICALLY CONDUCTIVE TEXTILE MATERIALS

RELATED APPLICATIONS

This application is a divisional application of Ser. No. 07/211,628, filed June 27, 1988, now U.S. Pat. No. 4,981,718, specific reference being made herein to obtain the benefit of its earlier filing date.

The present invention relates to a method for imparting electrical conductivity to textile materials. More particularly, the present invention relates to a method for producing conductive textile materials, such as fabrics, filaments, fibers and yarns by depositing a forming polymer of aniline onto the surface of the textile material.

Electrically conductive fabrics have, in general, been known for some time. Such fabrics have been manufactured by mixing or blending a conductive powder with a polymer melt prior to extrusion of the fibers from which the fabric is made. Such powders may include, for instance, carbon black, silver particles or even silver- or gold-coated particles. When conductive fabrics are made in this fashion, however, the amount of powder or filler required may be relatively high in order to achieve the desired level of conductivity and this high level of filler may adversely affect the properties of the resultant fibers. It is theorized that the high level of filler is necessitated because the filler particles must actually touch one another in order to obtain the desired conductivity characteristics for the resultant fabrics.

Such products have, as mentioned briefly above, some significant disadvantages. For instance, the mixing of a relatively high concentration of particles into the polymer melt prior to extrusion of the fibers may result in undesired alteration of the physical properties of the fibers and the resultant textile materials.

Anti-static fabrics may also be made by incorporating conductive carbon fibers, or carbon-filled nylon or polyester fibers in woven or knit fabrics. Alternatively, conductive fabrics may be made by blending stainless steel fibers into spun yarns used to make such fabrics. While effective for some applications, these "black stripe" fabrics and stainless steel-containing fabrics are expensive and of only limited use. Also known are metal-coated fabrics, such as nickel-coated, copper-coated and noble metal-coated fabrics, however, the process to make such fabrics is quite complicated and involves expensive catalysts, such as palladium or platinum, making such fabrics impractical for many applications.

A variety of polymers are also known to be convenient materials for achieving electrical conductivity for a variety of uses An excellent summary in this regard is provided in an article by G. Bryan Street of IBM Research Laboratories, Volume 1, "Handbook of Conductive Polymers", pages 266–291. As mentioned in that article, conductive polymers can be produced by either an electrochemical process where a suitable monomer such as pyrrole is oxidized on an anode to a desired polymer film configuration or, alternatively, the monomer may be oxidized chemically to a conductive polymer by ferric chloride or other oxidizing agents. While conductive films may be obtained by means of these methods, the films themselves are insoluble in either organic or inorganic solvents and, therefore, they cannot be reformed or processed into desirable shapes after they have been prepared. Such products in the past have, therefore been of only limited use in the manufacture of electrically conductive textile materials.

A significant advancement in the non-electrochemical, oxidative deposition of conductive polymers onto textile materials was reported by the inventors of the present application in prior, commonly assigned, U.S. Pat. No. 4,803,096. Therein it is disclosed that textile substrates can be made more uniformly electrically conductive, with adherent polymer coatings, and with reduced waste of reactants, by contacting the textile substrate under agitation conditions, with an aqueous solution of a pyrrole or aniline compound and an oxidizing agent and a doping agent or counter ion. Then a forming polymer or prepolymer of the pyrrole or aniline monomer is deposited onto the surface of the individual fibers of the textile substrate, thereby providing a uniform and coherent covering on the fibers of an ordered conductive film of the polymerized pyrrole or aniline compound.

The process of the prior application differs significantly from the prior art methods for making conductive composites in that the substrate being treated is contacted with the polymerizable compound and oxidizing agent at relatively dilute concentrations and under conditions which do not result in either the monomer or the oxidizing agent being taken up, whether by adsorption, impregnation, absorption, or otherwise, by the textile substrate (e.g. preformed fabric or the fibers, filaments or yarns forming the fabric). Rather, the polymerizable monomer and oxidizing reagent are first reacted with each other to form a "pre-polymer" species, which might be a water-soluble or dispersible free radical-ion of the compound, or a water-soluble or dispersible dimer or oligomer of the polymerizable compound, or some other unidentified "pre-polymer" species. In any case, it is the "pre-polymer" species, i.e. the forming polymer, which is deposited onto the surface of the individual fibers or filaments, as such, or as a component of yarn or preformed fabric or other textile material.

This process requires careful control of process conditions, such as reaction temperature, concentration of reactants (monomer, oxidizing agent and dopant) and textile material, and other process conditions (e.g. rate of agitation, other additives, etc.) so as to result in deposition of the pre-polymer as it is being formed. In other words, the rate of polymerization and deposition onto the surface is such that the forming polymer is immediately deposited onto the surface of the fibers and is not deposited in the aqueous solution in the form of discrete particles. This results in a very uniform film being formed at the surface of individual fibers or filaments without any significant formation of polymer in solution and also results in optimum usage of the polymerizable compound so that even with a relatively low amount of prepolymer applied to the surface of the textile, a relatively high amount of conductivity is capable of being achieved.

While the process previously described in U.S. Pat. No. 4,803,096 provides significant improvements over the prior art techniques, nevertheless, in the case of the polymerization of aniline onto the surface of the textile composite it has been particularly difficult to control the rate of polymerization of the aniline in such a manner that little or no polymerization occurs in the liquid phase. Oxidants reported for aniline polymerization in U.S. Pat. No. 4,803,096 include, in addition to ferric chloride, which is preferred in the case of pyrrole polymerization, several persulfates such as ammonium persulfate, sodium persulfate and potassium persulfate as well as several dichromates. Thus, for instance, if ammonium persulfate is used as the oxidant, relatively long initiation periods may be required, but then when prepolymer formation commences, the reaction usually proceeds at such a fast rate that at least some, undesirable quantities of insoluble polymeric material are formed in the liquid phase which simply precipitate out of solution and cannot be used.

According to the present invention, it has been found that Vanadium V compounds may effectively catalyze the oxidative polymerization of aniline in an aqueous solution under acidic conditions. The presence of Vanadium V compounds effectively controls the rate of polymerization of aniline such that little or no formation of undesired polyaniline occurs in the aqueous solution. Rather the prepolymer species is formed at a controlled rate and is adsorbed onto the surface of the textile material where desired polymerization proceeds to completion.

According to this invention, the addition to the aqueous solution of aniline monomer, a vanadyl oxidant, and optional dopant or counter ion, provides a more effective means for controlling the rate of polymer formation such that over a broad range of operating conditions the forming pre-polymer is adsorbed onto the surface of the fibers in a more desirable and expeditious fashion while effectively avoiding undesired polymerization of the monomer in solution and also avoiding precipitation of discrete particles which do not contribute to the electroconductivity of the treated textile substrate.

It is thus an object of the present invention to provide an improved method for preparing highly conductive, ordered, coherent film on the surface of textile materials. Such resultant textile materials may, in general, include fibers, filaments, yarns and fabrics. The treated textile materials exhibit excellent properties and characteristics and, therefore, are suitable and appropriate for a wide variety of end use applications for conductive textile materials as will be readily apparent to those skilled in the art.

According to the present invention there is provided a method for imparting electrical conductivity to textile materials by (a) contacting the textile material with an aqueous solution of an oxidatively polymerizable aniline compound and a vanadyl compound capable of oxidizing said compound to a polymer, said contacting being carried out at a pH of less than about 2 in the presence of a counter ion or doping agent which imparts electrical conductivity to said polymer when fully formed said contacting being under conditions at which the aniline compound and the vanadyl compound react with each other to form a prepolymer in said aqueous solution: (b) depositing onto the surface of the textile material the prepolymer of the aniline compound; and (c) allowing the prepolymer to polymerize while deposited on the textile material so as to uniformly and coherently cover the textile material with a conductive film of polymerized compounds.

As mentioned briefly above it is the prepolymer that is deposited onto the surface of the textile material. This deposition phenomenon may be said to be related to, or a species of, the more conventionally understood adsorption phenomenon. While the adsorption phenomenon is not necessarily a well known phenomenon in terms of textile finishing operations, it certainly has been known that monomeric materials may be adsorbed to many substrates including textile fabrics. The adsorption of polymeric materials from the liquid phase onto a solid surface is a phenomenon which is known, to some extent, especially in the field of biological chemistry. For example, reference is made to U.S. Pat. No. 3,909,195 to Machell, et. al. and U.S. Pat. No. 3,950,589 to Togo, et. al. which show methods for treating textile fibers with polymerizable compositions, although not in the context of electrically conductive fibers.

As described in U.S. Pat. No. 4,803,096, deposition of the forming prepolymer is caused to occur by controlling the type and concentration of polymerizable compound and/or oxidant in the aqueous reaction medium and by controlling other reaction conditions, such as reaction temperature, additives, etc. If the reaction conditions, such as concentration of polymerizable compound (relative to the textile material and/or aqueous phase) and/or oxidant, reaction temperature, etc. are conducive to high polymerization rates, polymerization may occur virtually instantaneously both in solution and on the surface of the textile material and a black powder, will be formed which will settle to the bottom of the reaction flask. If, however, the concentration of polymerizable compound, in the aqueous phase and relative to the textile material, is maintained at relatively low levels, or reaction temperature is lowered, polymerization occurs at a sufficiently slow rate, and the prepolymer species will be deposited onto the textile material before polymerization is completed. Reaction rates may become so slow that the total time takes several minutes, for example 5 minutes or longer, until a significant change in the appearance of the reaction solution is observed and the polymerization reaction has commenced, too long time periods may become commercially disadvantageous or even unacceptable. If a textile material is present under acceptable reaction conditions in this solution of forming pre-polymer, the forming species, while still in solution, or in colloidal suspension will be deposited onto the surface of the textile material and a uniformly coated textile material having a thin, coherent, and ordered conductive polymer film on its surface will be obtained.

Controlling the rate of prepolymer deposition onto the surface of the fibers of the textile material is not only of importance for controlling the reaction conditions to optimize yield and proper formation of the polymer on the surface of the individual fiber, but foremost influences the molecular weight and order of the deposited polymer. Higher molecular weight and higher order in electrically conductive polymers, in general, imparts higher conductivity and, most significantly, higher stability to these products.

Therefore, in this invention the deposition of the prepolymer onto the surface of the fiber is more effectively achieved over a broader range of concentrations of aniline monomer, oxidant or textile material and over a broader range of other reaction conditions, by the use of a vanadyl compound either alone or in combination with other oxidizing agents to catalyze the polymerization of said aniline compound.

Typical Vanadium V compounds which have been found to be effective as oxidants for the polymerization of aniline include sodium vanadate, ammonium vanadate, vanadium pentoxide and others. A common characteristic of all of these compounds is that they make available in an acidic, aqueous solution the vanadyl ion ($VO(H_2O)^5$) irrespective of the starting vanadium compound used.

There are a number of advantages associated with the use of vanadyl ions as oxidants in the polymerization of aniline. Firstly, they are highly water-soluble under the acidic conditions used, usually below a pH of about 2. Vanadyl ions also appear to have a desired oxidation potential and are particularly desirable for the polymerization of aniline because of their known ability to complex primary amines.

In order for the polymerization of aniline to commence the liquid has to be on the acid side, usually at a pH of lower than 2. Suitable acids to be used in such a process are sulfuric acid, hydrochloric acid or many other inorganic acids but also organic acids such as paratoluene sulfonic acid or parachlorobenzene sulfonic acid. Also, sulfonic acid derivative of the naphthalene series may be successfully used in such a process. In addition, aliphatic sulfonic acids such as ethane sulfonic acid or perfluoronated sulfonic acids such as perfluoromethane sulfonic acid and the like may be used. The use of organic sulfonic acids, particularly aromatic organic sulfonic acids, is particularly useful as these compounds at the same time represent doping agents for the polymeric material formed on the surface of the textile composites. Without such a doping these compounds would not be electrically conductive.

Theoretical considerations indicate that at least two moles of Vanadium V compounds should be used per mole of aniline to be polymerized. However, lower amounts or higher amounts may be used if so desired. Therefore, amounts from one mole to three moles of Vanadium V compounds, preferably two moles, may be used. As Vanadium compounds are fairly expensive and may create a hazard in view of their disposal after the reaction is completed, it now has also been found that these compounds can be used in catalytic amounts only If catalytic amounts of Vanadium V compounds are used, the amount of Vanadium V compounds are added to the aqueous solution of aniline in the presence of the textile composite and a "per" compound is continuously added to the mixture over a prolonged period of time. This allows the regeneration of the vanadyl ion discussed above in a continuous manner. Particularly useful for this regeneration of the Vanadium V compounds have been persulfates such as ammonium, potassium or sodium persulfate. Other per pounds may be similarly used but ammonium persulfate is the preferred oxidizing agent for the catalytic reaction. Theoretical consideration indicates that one mole of persulfate is sufficient to oxidize aniline to its polymer but lower and higher amounts of persulfate may be used if desirable.

Concentrations of as little as 0.3 grams per liter of sodium vanadate have proven to be highly effective to catalyze the polymerization of aniline to polyaniline with the use of ammonium persulfate. It is, however, possible to use lesser or higher amounts of these compounds if so desired. As mentioned above, this concentration can be increased up to the amounts where the sodium vanadate is no longer a catalyst but the sole oxidizing agent for this reaction. Preferable concentrations of sodium vanadate are from 0.1 to 0.5 grams per liter, preferably about 0.3 grams per liter.

If Vanadium V compounds are used for the oxidative polymerization of aniline on the surface of textile composites, brightly green composites are obtained having outstanding electrical conductivity, both color and conductivity indicating a high degree of order of the deposited polymeric material on the surface of each fiber of the textile composites.

Aniline is the preferred monomer, both in terms of the conductivity of the doped films and for its reactivity. However, other aniline derivatives, including meta- and/or ortho-substituted anilines such as halogen, alkyl, aryl, oxalkyl or oxaryl substitutents, especially chloroaniline, toluidine, and methoxyanilines. In addition, two or more aniline monomers can be used to form a conductive copolymer, especially those containing predominantly aniline, especially at least 50 mole percent, preferably at least 70 mole percent, and especially preferably at least 90 mole percent of aniline. In fact, the addition of the aniline derivative as comonomer having a lower polymerization reaction rate than aniline may be used to effectively lower the overall polymerization rate. Use of other aniline monomers is, however, not preferred, particularly when especially low resistivity is desired, for example, below about 1,000 ohms per square.

Doping agents which may be used include any of a wide variety of anionic counter ions such as iodine, chloride and perchlorate, provided by, for example, $I_2$, HCl, $HClO_4$, and their salts and so on, can be used. Other suitable anionic counter ions include, for example, sulfate, bisulfate, sulfonate, sulfonic acid, fluoroborate, $PF_6-$, $AsF_6$, and $SbF_6-$ and can be derived from the free acids, or soluble salts of such acids, including inorganic and organic acids and salts thereof. Furthermore, as is well known, certain oxidants, such as ferric chloride, ferric perchlorate, cupric fluoroborate, and others, can provide the oxidant function and also supply the anionic counter ion. However, if the oxidizing agent is itself an anionic counter ion it may be desirable to use one or more other doping agents in conjunction with the oxidizing agent.

The deposition rates and polymerization rates may be further controlled by other variables in the process such as pH, which is preferably maintained at less than about 2; and temperature, preferably maintained at from about 0C. to 30C. Still further factors include, for instance, the presence of surface active agents or other monomeric or polymeric materials in the reaction medium which may interfere with and/or slow down the polymerization rate. With regard to deposition rate, the addition of electrolytes, such as sodium chloride, calcium chloride, etc. may enhance the rate of deposition.

The deposition rate also depends on the driving force of the difference between the concentration of the adsorbed species on the surface of the textile material and the concentration of the species in the liquid phase exposed to the textile material. This difference in concentration and the deposition rate also depend on such factors as the available surface area of the textile material exposed to the liquid phase and the rate of replenishment of the prepolymer in the vicinity of the surfaces of the textile material available for deposition.

Therefore, it follows that best results in forming uniform coherent conductive polymer films on the textile material are achieved by continuously agitating the reaction system in which the textile material is in contact during the entire polymerization reaction. Such agitation can be provided by simply shaking or vibrating or tumbling the reaction vessel in which the textile material is immersed in the liquid reactant system or alternatively, the liquid reactant system can be caused to flow through and/or across the textile material.

As an example of this later mode of operation, it is feasible to force the liquid reaction system over and through a spool or bobbin of wound textile filaments, fibers (e.g. spun fibers), yarn or fabrics, the degree of force applied to the liquid being dependent on the winding density, a more tightly wound and thicker product requiring a greater force to penetrate through the textile and uniformly contact the entire surface of all of the fibers or filaments or yarn. Conversely, for a loosely wound or thinner yarn or filament package, correspondingly less force need be applied to the liquid to cause uniform contact and deposition. In either case, the liquid can be recirculated to the textile material as is customary in many types of textile treating processes. Yarn packages up to 10 inches in diameter have been treated by the process of this invention to provide uniform, coherent, smooth polymer films. The observation that no particulate matter is present in the coated conductive yarn package provides further evidence that it is not the polymer particles, per se which are water-insoluble and which, if present, would be filtered out of the liquid by the yarn package—that are being deposited onto the textile material.

As an indication that the polymerization parameters, such as reactant concentrations, temperature, and so on, are being properly maintained, such that the rate of deposition of the prepolymer is sufficiently high that polymer does not accumulate in the aqueous liquid phase, the liquid phase should remain clear or at least substantially free of particles visible to the naked eye throughout the polymerization reaction.

One particular advantage of the process of this invention is the effective utilization of the polymerizable monomer. Yields of aniline polymer, for instance, based on aniline monomer, of greater than 50%, especially greater than 75%, can be achieved.

When the process of this invention is applied to textile fibers, filaments or yarns directly, whether by the abovedescribed method for treating a wound product, or by simply passing the textile material through a bath of the liquid reactant system until a coherent uniform conductive polymer film is formed, or by any other suitable technique, the resulting composite electrically conductive fibers, filaments, yarns, etc. remain highly flexible and can be subjected to any of the conventional knitting, weaving or similar techniques for forming fabric materials of any desired shape or configuration, without impairing the electrical conductivity.

Furthermore, another advantage of the present invention is that the rate of oxidative polymerization can be effectively controlled to a sufficiently low rate to obtain desirably ordered polymer films of high molecular weight to achieve increased stability, for instance against oxidative degradation in air.

While the precise identity of the adsorbing species has not been identified with any specificity, certain theories or mechanisms have been advanced although the invention is not to be considered to be limited to such theories or proposed mechanisms. It has thus been suggested that in the chemical or electrochemical polymerization, the monomer goes through a cationic, free radical ion stage and it is possible that this species is the species which is adsorbed to the surface of the textile fabric. Alternatively, it may be possible that oligomers or prepolymers of the monomers are the species which are deposited onto the surface of the textile fabric.

In general, the amount of textile material per liter of aqueous liquor may be from about 1 to 5 to 1 to 50, preferably from about 1 to 10 to about 1 to 30. A wide variety of textile materials may be employed in the method of the present invention, for example, fibers, filaments, yarns and various fabrics made therefrom. Such fabrics may be woven or knitted fabrics and are preferably based on synthetic fibers, filaments or yarns. In addition, even non-woven structures, such as felts or similar materials, may be employed. Preferably, the polymer should be deposited onto the entire surface of the textile. This result may be achieved, for instance, by the use of a relatively loosely woven or knitted fabric but, by contrast, may be relatively difficult to achieve if, for instance, a highly twisted thick yarn were to be used in the fabrication of the textile fabric. The penetration of the reaction medium through the entire textile material is, furthermore, enhanced if, for instance, the fibers used in the process are texturized textile fibers.

Fabrics prepared from spun fiber yarns as well as continuous filament yarns may be employed. In order to obtain optimum conductivity of a textile fabric, however, it may be desirable to use continuous filament yarns so that a film structure suitable for the conducting of electricity runs virtually continuously over the entire surface of the fabric. In this regard, it has been observed, as would be expected, that fabrics produced from spun fibers processed according to the present invention typically show somewhat less conductivity than fabrics produced from continuous filament yarns.

A wide variety of synthetic fibers may be used to make the textile fabrics of the present invention. Thus, for instance, fabric made from synthetic yarn, such as polyester, nylon and acrylic yarns, may be conveniently employed. Blends of synthetic and natural fibers may also be used, for example, blends with cotton, wool and other natural fibers may be employed. The preferred fibers are polyester, e.g. polyethylene terephthalate including cationic dyeable polyester and polyamides, e.g. nylon, such as Nylon 6, Nylon 6,6, and so on. Another category of preferred fibers are the high modulus fibers such as aromatic polyester, aromatic polyamide and polybenzimidazole. Still another category of fibers that may be advantageously employed include high modulus inorganic fibers such as glass and ceramic fibers. Although it has not been clearly established, it is believed that the sulfonate groups or amide groups present on some of these polymers may function as a "built-in" doping agent.

Conductivity measurements have been made on the fabrics which have been prepared according to the method of the present invention. Standard test methods are available in the textile industry and, in particular, AATCC test method 76-1982 is available and has been used for the purpose of measuring the resistivity of textile fabrics. According to this method, two parallel electrodes 2 inches long are contacted with the fabric and placed 1 inch apart. Resistivity may then be measured with a standard ohm meter capable of measuring values between 1 and 20 million ohms. Measurements must then be multiplied by 2 in order to obtain resistivity in ohms on a per square basis. While conditioning of the samples may ordinarily be required to specific relative humidity levels, it has been found that conditioning of the samples made according to the present invention is not necessary since conductivity measurements do not vary significantly at different humidity levels. The measurements reported in the following example, are however, conducted in a room which is set to a temperature of 70F. and 50% relative humidity. Resistivity measurements are reported herein and in the examples in ohms per square (Ω/sq) and under these conditions the corresponding conductivity is one divided by resistivity.

In general, fabrics treated according to the method of the present invention show resistivities of below $10_6$ ohms per square, such as in the range of from about 50 to 500,000 ohms per square, preferably from about 500 to 5,000 ohms per square. These sheet resistivities can be converted to volume resistivities by taking into consideration the weight and thickness of the polymer films. Some samples tested after aging for several months do not significantly change with regard to resistivity during that period of time. In addition, samples heated in an oven to 380F. for about one minute also show no significant loss of conductivity under these conditions. These results indicate that the stability of the conductive film made according to the process of the present invention on the surface of textile materials is excellent, indicating a higher molecular weight and a higher degree of order than usually obtained by the chemical oxidation of these monomers.

The invention may be further understood by reference to the following examples but the invention is not to be construed as being unduly limited thereby. Unless otherwise indicated, all parts and percentages are by weight.

EXAMPLE I

Five grams of a polyester fabric consisting of a 2×2 right hand twill weighing approximately 6.6 ounces per square yard being constructed from a 2/150/34 textured polyester yarn from Celanese Type 667 (fabric construction is such that approximately 70 ends are in the warp direction and 55 picks are in the fill direction) is placed into an 8 ounce jar and 50 cc of water are added to the fabric. The jar is closed and the fabric is properly wetted out with the water by shaking. To this a mixture of 0.3 gram of freshly distilled aniline in 50 cc of water are added. Separately 5 grams of paratoluene sulfonic acid are dissolved in 50 cc of water followed by the dissolution of 0.6 g vanadium pentoxide resulting in two moles of vanadate ions or the theoretical amount needed to oxidize aniline to its emeraldine polymer. This is then added to the jar and the jar is rotated at approximately 60 RPM for four hours at room temperature. After this time the fabric is withdrawn, rinsed three times with water and air dried. The bright green fabric had a conductivity of 23 and 38M ohms per square in the warp and fill direction of the fabric.

EXAMPLE II

Example I was repeated except that 1.2 grams of vanadium pentoxide were used representing a two fold excess over the theoretical amount. The resulting fabric showed a resistivity of 2 1 and 2.2M ohms per square in the two directions of the fabric.

EXAMPLE III

Example I was repeated except that 5 grams of a textured Nylon 6,6 fabric, Style 314, from Test Fabrics, Inc. is being used. The other chemicals are as follows: 0.3 grams of aniline, 10 grams of paratoluene sulfonic acid and 1 gram of sodium vanadate. The reaction is conducted for four hours. The resulting fabric showed a resistivity of 320 and 420 ohms per square in the two directions of the fabric.

EXAMPLE IV

Experiment III was repeated except that 10 grams of 37% hydrochloric acid in water was used. The resulting fabric had a conductivity of 3.3 and 5.6M ohms per square in the two directions of the fabric.

EXAMPLE V

Example III was repeated except that 10 grams of parachlorobenzene sulfonic acid were used. The resulting fabric had a conductivity of 340 and 500 ohms per square in the two directions of the fabric.

EXAMPLE VI

The following examples will demonstrate the use of catalytic amounts of vanadium in order to allow the continuous addition of the oxidizing agent. A different experimental set-up as follows had to be used. A JF dyeing machine from Werner Mathis (Switzerland) was modified insofar as the reaction chamber as well as the rotating basket was fabricated from polyvinyl chloride to avoid corrosion of the stainless steel. The PVC chamber was jacketed so it could be cooled with water or with chilled water. An addition funnel allowed the controlled addition of chemicals to the reaction chamber. An addition tank was used to premix chemicals before ever added into the machine. 69.6 grams of the knitted textured Nylon 6,6 fabric described in Example III was placed in the jet dyeing machine and the door was sealed. In the addition tank 650 cc of water were mixed with 4.2 grams of aniline and 0.5 grams of sodium vanadate. Upon dissolution these chemicals were added into the reaction chamber and the cloth was agitated in the basket. Subsequently, 50 grams of toluene sulfonic acid was dissolved in 650 cc of water in the addition tank and this mixture was also added to the reaction chamber. Separately 10.5 grams of ammonium persulfate was dissolved in 250 cc of water and added to the reaction chamber under constant agitation of the cloth at the rate of 1 cc per minute. After 250 minutes the ammonium persulfate has been added and the reaction was continued for an additional two hours. During the entire time the reaction chamber was cooled with regular tap water. The liquid was withdrawn from the reaction chamber and the fabric was thoroughly washed two times with fresh water, withdrawn and air dried. The fabric had an electrical resistivity of 250 ohms in each direction of the fabric.

EXAMPLE VII

Example VI was repeated except that 66.7 grams of the fabric used in Example I was used. The chemicals were as follows: 2 grams of aniline, 0.5 grams of sodium vanadate, 50 grams of paratoluene sulfonic acid. For the continuous addition of the oxidizing agent 5.5 grams of ammonium persulfate was dissolved in 250 cc of water. Temperature and addition mode was the same as in Example VI. The resulting fabric showed a resistivity of 500 ohms per square in the warp direction and 800 ohms per square in the fill direction.

EXAMPLE VIII

Example VII was repeated except 64.1 grams of the textured polyester fabric was used. The other chemicals were as follows: 2.6 grams of aniline, 0.5 grams of sodium vanadate, 50 grams of parachlorobenzene sulfonic acid, and for the continuous addition 6.4 grams of ammonium persulfate was dissolved again in 250 milliliters of water. Addition mode and temperatures were identical to the previous experiment. The resulting fabric had a resistivity of 360 ohms per square in the warp direction and 550 ohms per square in the fill directions.

What is claimed is:

1. An electrically conductive textile material having a resistivity in the range from about 50 to about $10^6$ ohms per square which is a product of the process comprising: (a) contacting the textile material with an aqueous solution of an oxidatively polymerizable aniline compound and a vanadyl compound agent capable of oxidizing said compound to a polymer, said contacting being carried out at a pH of less than about 2 in the presence of a counter ion or doping agent which imparts electrical conductivity to said polymer when fully formed, said contacting being under conditions at which the aniline compound and the vanadyl compound react with each other to form a prepolymer in said aqueous solution; (b) depositing onto the surface of the textile material the prepolymer of the aniline compound; and (c) allowing the prepolymer to polymerize while deposited on the textile material so as to uniformly and coherently cover the textile material with a conductive film of polymerized compound.

2. The electrically conductive material of claim 1 which is a fabric comprised of fibers, filaments or yarns of polyester or polyamide.

3. The electrically conductive material of claim 1 wherein the aniline compound is aniline and the polyaniline film has a thickness of less than about 2 microns.

4. An electrically conductive textile material which comprises a textile material onto which has been deposited a film of an electrically conductive aniline polymer.

5. The electrically conductive textile material of claim 4 having a resistivity in the range of from about 50 to about $10^6$ ohms per square.

6. The electrically conductive material of claim 5 which is a fabric comprised of fibers, filaments or yarns of polyester or polyamide.

7. The electrically conductive material of claim 4 wherein said polyaniline film has a thickness of less than about 2 microns.

* * * * *